(12) United States Patent
Saunders

(10) Patent No.: US 10,206,536 B2
(45) Date of Patent: Feb. 19, 2019

(54) PIZZA TRAY

(71) Applicant: Arlene Saunders, Englewood Cliffs, NJ (US)

(72) Inventor: Arlene Saunders, Englewood Cliffs, NJ (US)

(*) Notice: Subject to any disclaimer, the term of this patent is extended or adjusted under 35 U.S.C. 154(b) by 96 days.

(21) Appl. No.: 14/668,269

(22) Filed: Mar. 25, 2015

(65) Prior Publication Data

US 2015/0272386 A1 Oct. 1, 2015

Related U.S. Application Data

(60) Provisional application No. 61/970,154, filed on Mar. 25, 2014, provisional application No. 61/993,756, filed on May 15, 2014.

(51) Int. Cl.
| | |
|---|---|
| *A47J 37/07* | (2006.01) |
| *A47J 37/01* | (2006.01) |
| *A21D 8/06* | (2006.01) |
| *A21D 13/41* | (2017.01) |

(52) U.S. Cl.
CPC ............... *A47J 37/01* (2013.01); *A21D 8/06* (2013.01); *A21D 13/41* (2017.01)

(58) Field of Classification Search
CPC .......... A47J 37/01; A47J 36/02; A47J 31/015; B65D 1/36; B65D 85/36; B65D 2585/366; A21D 8/06; A21D 13/41

USPC ................................................. 99/449, 450
See application file for complete search history.

(56) References Cited

U.S. PATENT DOCUMENTS

| | | | | |
|---|---|---|---|---|
| 1,021,640 | A * | 3/1912 | Steitler | A47J 37/067 220/23.8 |
| 5,924,591 | A * | 7/1999 | Contos | A21B 3/15 220/23.8 |
| 2005/0217498 | A1* | 10/2005 | Miller | A47J 43/20 99/426 |

OTHER PUBLICATIONS

Gray, Billy; Commercial Observer; "Why Domino's Soars in NYC While Pizza Hut Plummets;" 3 pages (2013); http://commercialobserver.com/2013/12/why-dominos-soars-in-nyc-while-pizza-hut-plummets/.

* cited by examiner

*Primary Examiner* — Dana Ross
*Assistant Examiner* — Brandon Harvey
(74) *Attorney, Agent, or Firm* — Jonathan D. Ball; Greenberg Traurig, LLP

(57) ABSTRACT

A tray or pan for preparing and serving pizza is disclosed. The tray or pan may have a first cooking region separated from a second cooking region by a partition. The tray or pan may be discoid in shape and comprise an annular partition defining a smaller discoid surface within the partition.

7 Claims, 5 Drawing Sheets

FIG. 4    FIG. 5
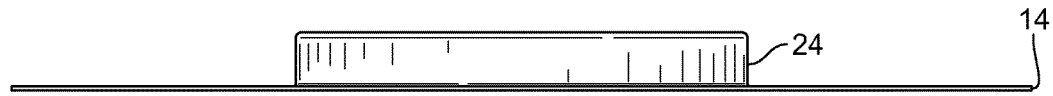
FIG. 6
FIG. 7

PIZZA TRAY

CROSS-REFERENCE TO RELATED APPLICATIONS

This application claims priority to U.S. Provisional Application Nos. 61/970,154, filed Mar. 25, 2014 and 61/993,756, filed May 15, 2014, the disclosures of which are incorporated by reference herein.

FIELD OF INVENTION

The present invention relates generally to a tray or pan for preparing and serving pizza. More specifically, the invention relates to a tray or pan having a first cooking region separated from a second cooking region by a partition. The tray or pan may be discoid in shape and comprise an annular partition defining a smaller discoid surface within the partition.

BACKGROUND

There exist regional preferences among the several varieties of pizza available. In the northeast of the United States, for example, New York-style pizza is popular. It is characterized by a thin crust and is typically hand tossed. New York pizza is typically prepared on a flat aluminum tray ranging from about 12 inches to over 20 inches in diameter. Chicago-style or deep dish pizza, on the other hand, is characterized by a thick crust, often two to three inches in thickness. Deep dish pizza is usually baked in a pan having an edge wall resembling a cake or pie pan. The dough is usually pressed into the pan rather than tossed as in New York Style pizza.

It is an object of the invention to provide a pizza tray or pan for simultaneously preparing thin crust and deep dish pizza on the same tray or pan.

SUMMARY OF THE INVENTION

In accordance with the foregoing objectives and others, the present invention provides a pizza tray or pan comprising a generally planar surface having a partition separating a first region from a second region of said tray or pan. The tray or pan may be discoid in overall shape and the partition may comprise an annular wall defining a region inside the wall for making a first edible composition (e.g., a deep dish pizza) and an area outside of the wall for making a different edible composition (e.g., a thin crest pizza). The outer cooking surface may further be enclosed by a rim or wall.

These and other aspects of the present invention will become apparent to those skilled in the art after a reading of the following detailed description of the invention, including the appended claims.

BRIEF DESCRIPTION OF THE DRAWINGS

FIGS. 4-7 illustrates left and right and front and back side views of the pizza tray of FIG. 1. Since the pizza tray 10 of FIG. 1 possesses radial symmetry, the views are identical. The thickness 14 of the tray may range, for example, from about 30 mil to about 100 mil (e.g., about 40-60 mil). The height of wall 24, which is vertical in the embodiment of FIG. 1, may range from about 0.5 inches to about 3 inches or more, but is approximately one inch tall in the illustrated embodiment.

DETAILED DESCRIPTION

Figure 1:
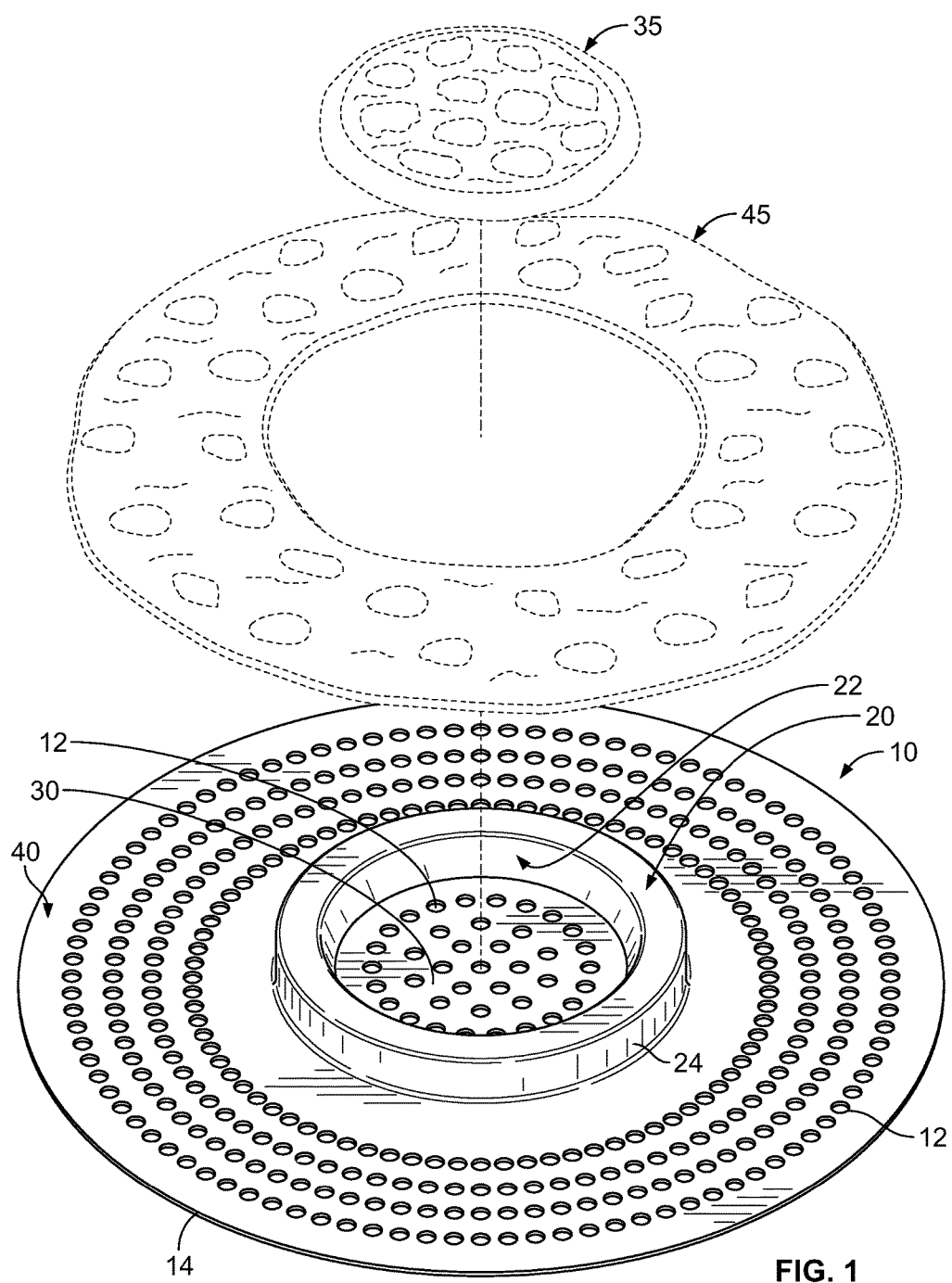
FIG. 1 illustrates an exploded view of one embodiment of a pizza tray 10 according to the invention. In this embodiment, pizza tray 10 is discoid in shape. A wall 24 rises approximately 0.5-3 inches (e.g., about 1-2") above the top surface of the tray and has a width 20 of about 0.5-2 inches. The inner wall 22 is slightly inclined away from vertical and separates the tray into an inner region 30 and an outer region 40. A plurality of perforations or holes 12 are punched through both the inner and outer regions of the tray. The outer region 40 may be used to prepare a thin crust pizza 45 and the inner region 30 may be used to prepare a thick crust pizza 35.
Figure 2:
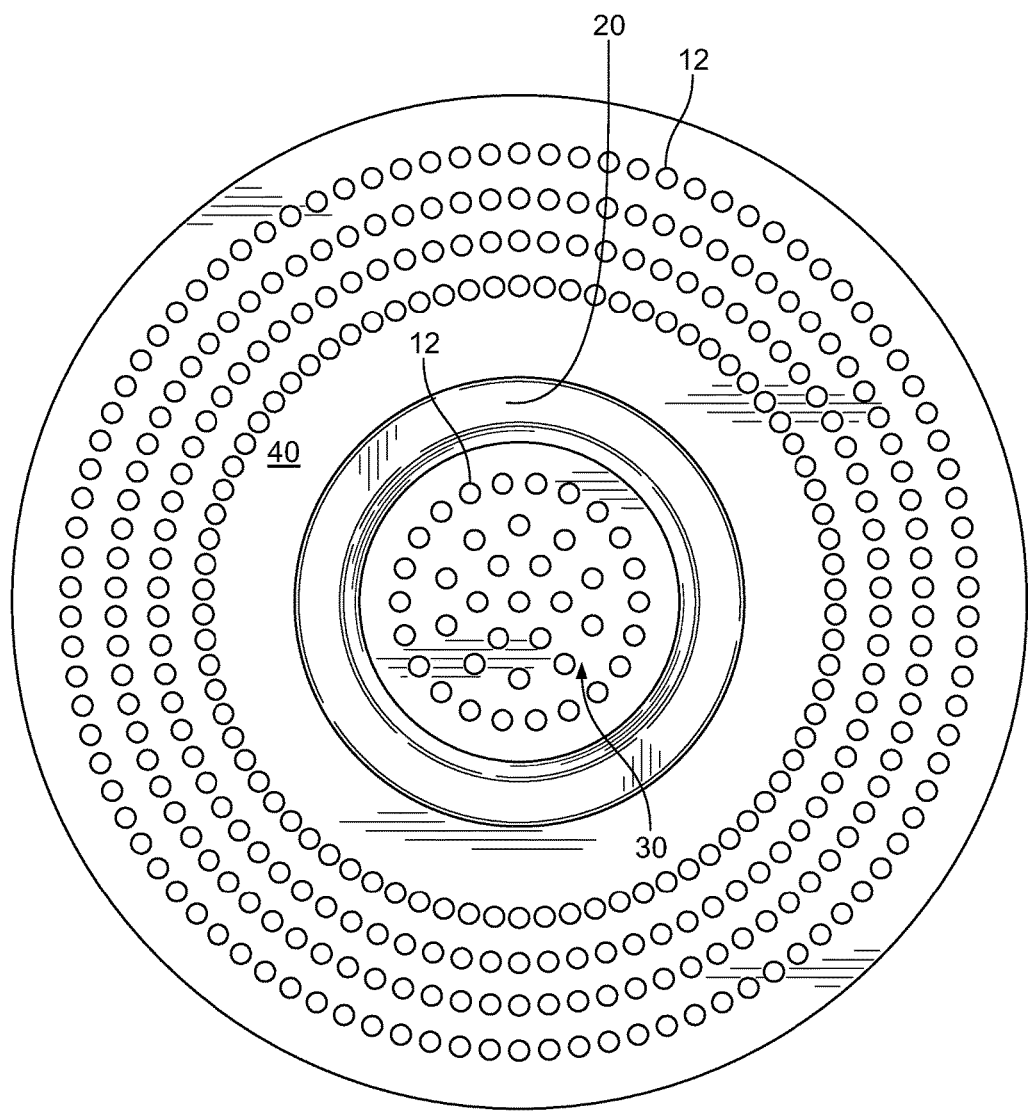
FIG. 2 illustrates a top view of the pizza tray 10 of FIG. 1. The pizza tray comprises flat surfaces 30 and 40 for preparing a thin crust pizza. An annular wall 20 separates surfaces 30 and 40. Surfaces 30 and 40 contain a plurality of perforations (holes) punches through the tray.
Figure 3:
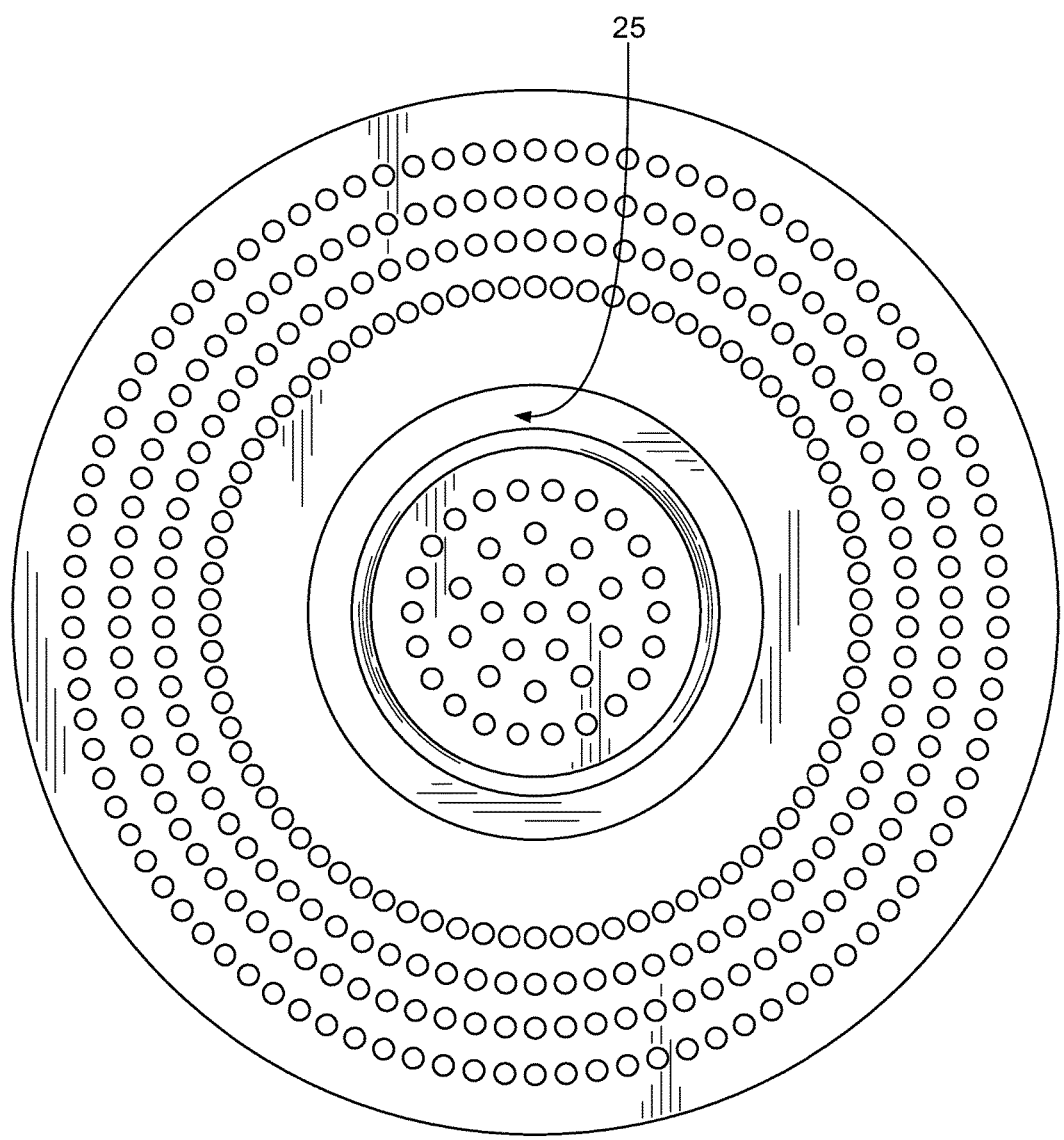
FIG. 3 illustrates a bottom view of the pizza tray of FIG. 2. As shown, there is an annular recess 25 in the bottom corresponding to the wall surface 20. The recess is formed, for example, by molding the pan using a punch or pressing a rotating blank against a chuck on a lathe.

Referring now to FIG. 1, one embodiment of a pizza tray 10 according to the invention is shown. Pizza tray 10 may by any shape include rectangular or circular (discoid), but is typically discoid. The diameter (O.D.) of the tray is not particularly important, but may range, for example, from about 8" (inches) to about 28" or more, more typically, from about 10" to about 19", or from about 12" to about 16". In various embodiments, the outer diameter (O.D.) of the pizza tray is about 10", about 11", about 12", about 13", about 14", about 15", about 16", about 17", about 18", about 19", about 20", about 21", or about 22", or about 24". In embodiments where the tray is not circular, the foregoing dimensions refer to the largest dimension of the tray.

A wall 24 rises from the surface of the tray, for example, the wall may rise approximately 0.25-3 inches in height or more, but will typically rise about 0.5" to about 2.5" or from about 0.75" to about 2" or from about 1" to about 1.5" above the surface of the tray. In one embodiment, the wall rises about 0.5 inches. In another embodiment, the wall rises about one inch. Wall 24 may rise vertically or at an incline. Wall 24 defines an area 40 extending from the wall 24 to the outer edge of the tray. In the embodiment shown in FIG. 1, area 40 is in the shape of an annulus.

An internal wall 22 defines an area 30 within the internal wall. The inner wall 22 may be vertical or may be inclined. In FIG. 1, the inner wall is slightly inclined away from vertical and resembles a pie pan. The inner wall may be inclined, for example, between about 5° and about 45° from vertical (or between about 10° and about 30°). The total vertical height of wall 22 may be the same or different than wall 24, and may, for example, rise from the surface of the tray approximately 0.25-3 inches in height or more, but will typically rise about 0.5" to about 2.5" or from about 0.75" to about 2" or from about 1" to about 1.5" above the surface of the tray. In one embodiment, the inner wall 22 rises about 0.5 inches. In another embodiment, the inner wall 22 rises about one inch. In a further embodiment, the inner wall 22 rises about 1.5 inches. In yet another embodiment, the inner wall 22 rises about 2 inches about the surface 30. Inner wall 30 defines an inner region 30. Inner region 30 may be any shape, for example, rectangular or circular. In the embodiment in FIG. 1, inner region 30 is circular. Inner region 30 may be coplanar with outer region 40. Inner region 30 may, for example, have a size (e.g., diameter) of about 4-12 inches, or about 5", about 6", about 7", about 8", about 9", about 10" about 11", or about 12". In embodiments where the inner region 30 is not circular, the foregoing dimensions refer to the largest dimension of the inner region.

A plurality of perforations (or holes) 12 are punched through the inner and/or outer regions of the tray. In one embodiment, the perforations are located only in the outer region 40. In another embodiment, the perforations are located only in the inner region 30. In other embodiments, the perforations are located in both the inner region 30 and the outer region 40. The perforations may be for example using a circular punch or the like. The perforations may be any shape, but are typically round. The size (diameter) of the perforations may range, for example, from about 0.1 cm to about 1.5 cm, or from about 0.25 cm to about 1.5 cm, or from about 0.5 cm to about 1 cm. In some embodiments, the perforations in inner region 30 are differently sized than the perforations in outer region 40. In other embodiments, the perforations in inner region 30 are the same size as the perforations in outer region 40. The perforations may be arranged with radial symmetry from the center of the tray. The perforations may serve to allow heated air to reach the underside of the pizza to produce a crispier crust.

In the embodiment of FIG. 1, outer wall 24 and inner wall 22 are separated by a wall surface 20. Wall surface 20 may be, for example, from about 0.25" to about 2" wide (e.g., from about 0.5" to about 1.5" wide). In other embodiments, outer wall 24 and inner wall 22 come together to form a rounded or pointed junction without having a defined surface 20 therebetween.

In one embodiment, the outer surface 40 is generally planar. In one embodiment, the inner surface 30 is generally planar. In one embodiment the inner surface 30 and the outer surface 40 are generally planar. In one embodiment the inner surface 30 and the outer surface 40 are generally coplanar. In one embodiment, the inner surface 30 is not planar. In one embodiment, the inner surface 30 is not planar. In one embodiment, the inner surface 30 is bowl shaped. In one embodiment, the inner surface 30 is not perforated and is configured to hold a liquid (e.g., a sauce or the like).

Figure 8:
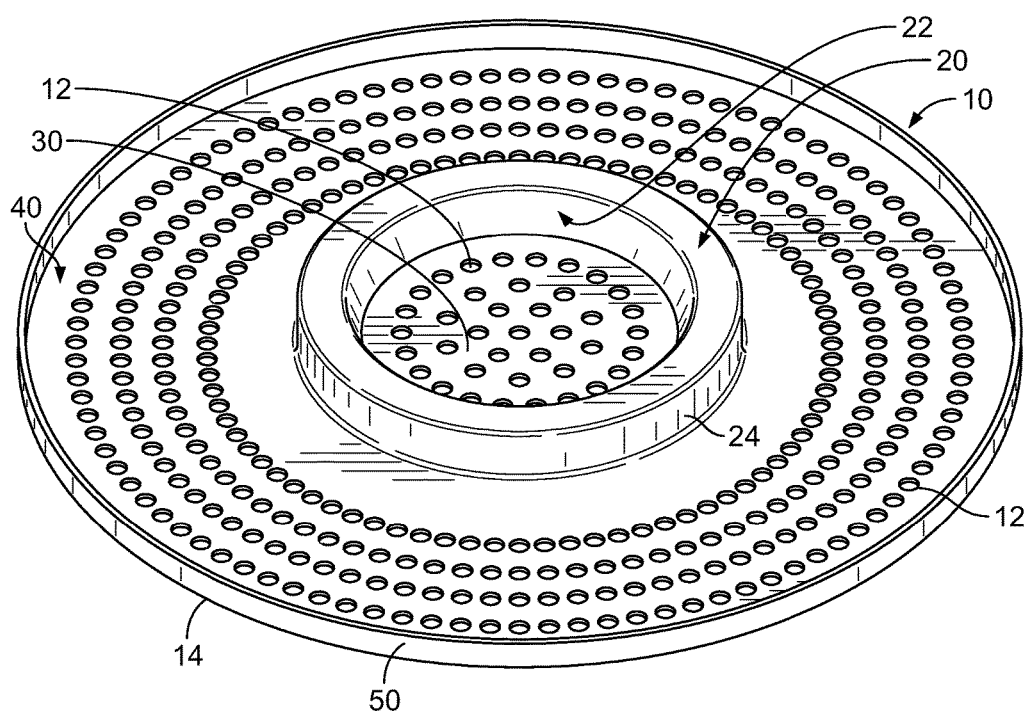
FIG. 8 illustrates a perspective view of an embodiment of a pizza pan 10 according to the invention. A pan rim or wall 50 rises vertically or at an incline, approximately 0.1-4 inches or more (e.g., about 0.5-1") above the surface of outer region 40. In this embodiment, outer region 40 may also be used to prepare a thick crust pizza.

In the embodiment of FIG. 8, a pan wall 50 circles the outer edge of outer region 40 and rises vertically or at an incline from the surface. The height of the pan wall is not restricted and may rise approximately 0.1-4 inches or more, but will typically rise about 0.2 to about 3.5" or from about 0.25 to about 3" or from about 0.4 to about 2.5" or from about 0.5 to about 2" or from about 0.6 to about 2.2" or from about 1 to about 1.5" above the surface of the outer region 40. In one embodiment, the pan wall rises about 0.25 inches. In another embodiment, the pan wall rises 0.5 inches. In another embodiment, the pan wall rises about 1 inch, about 2 inches, about 3 inches, or about 4 inches.

The tray or pan may be made of aluminum (e.g., anodized aluminum), cold rolled steel, or the like. The tray or pan may have a hardness, for example, of about 20-25 Rockwell. In one embodiment, the tray or pan is made from H14 grade aluminum. The aluminum may be alloyed with manganese and or magnesium. In one embodiment, the tray is made from type 304 steel.

The outer region 40 may be used to prepare a first food product (illustrated as a thin crust pizza 45 in FIG. 1) and the inner region 30 may be used to prepare a different food product (illustrated as a thick crust pizza 35 in FIG. 1). The inner region may also be used to hold a bowl, for example, a salad or soup bowl. In one embodiment the inner and or outer cooking surfaces have a non-stick coating.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described therein will become apparent to those skilled in the art from the foregoing description. Such modifications are also intended to fall within the scope of the appended claims. All publications cited herein are incorporated by reference in their entirety.

The invention claimed is:

1. A pizza tray or pan comprising a generally planar surface having a partition separating a first cooking surface from a second cooking surface of said tray or pan, wherein said partition comprises an annular wall rising from about 0.25" to about 3" above the surface of the tray or pan, and defines an inner cooking surface and an outer cooking surface, and wherein a plurality of perforations are disposed through the inner and outer cooking surfaces to permit heated air to pass therethrough.

2. The pizza tray or pan according to claim 1, wherein said tray or pan has a discoid shape with an outer diameter ranging from about 12" to about 22".

3. The pizza tray or pan according to claim 1, wherein said wall comprises an inner wall and an outer wall, the inner wall inclining at an angle away from the center of the tray or pan.

4. The pizza tray or pan according to claim 1, wherein said inner wall defines a circular inner cooking region having a diameter from about 4" to about 12".

5. The pizza tray or pan according to claim 1, wherein said tray or pan is composed of aluminum or steel.

6. A method of cooking two food products comprising simultaneously heating a first food product on the first region and a second food product on the second region of the tray or pan of claim 1.

7. The method according to claim 6, wherein the first food product is a thin crust pizza and is cooked on the annulus shape of the outer cooking region and the second food product is a deep dish or thick crust pizza and is cooked on the inner circular cooking region.

* * * * *